United States Patent [19]

Lula

[11] 4,366,971

[45] Jan. 4, 1983

[54] CORROSION RESISTANT TUBE ASSEMBLY

[75] Inventor: Remus A. Lula, Natrona Heights, Pa.

[73] Assignee: Allegheny Ludlum Steel Corporation, Pittsburgh, Pa.

[21] Appl. No.: 188,179

[22] Filed: Sep. 17, 1980

[51] Int. Cl.³ .......................... F16L 9/14; F16L 15/00
[52] U.S. Cl. ..................................... 285/55; 285/173; 285/286; 285/333; 285/417
[58] Field of Search ................... 285/55, 14, 417, 333, 285/334, 173, 329

[56] References Cited

U.S. PATENT DOCUMENTS

| | | |
|---|---|---|
| 1,306,690 | 6/1919 | Gillespie . |
| 1,827,437 | 10/1931 | Pascoe . |
| 1,840,305 | 1/1932 | Andrus et al. . |
| 1,989,614 | 1/1935 | Halpern et al. . |
| 2,201,862 | 5/1940 | Heisterkamp . |
| 2,216,033 | 9/1940 | Hopkins . |
| 2,240,021 | 4/1941 | Rutherford . |
| 2,258,563 | 10/1941 | Armstrong et al. . |
| 2,303,778 | 12/1942 | Wesley . |
| 2,507,849 | 5/1950 | Bland ............................. 285/14 X |
| 2,919,936 | 1/1960 | Hurley . |
| 3,020,068 | 2/1962 | Costanzo . |
| 3,077,661 | 2/1963 | Fromson . |
| 3,192,612 | 7/1965 | Elliott et al. . |
| 3,307,860 | 3/1967 | Blount et al. ......................... 285/55 |
| 3,336,054 | 8/1967 | Blount et al. ......................... 285/55 |
| 3,758,361 | 9/1973 | Hunter . |
| 3,843,170 | 10/1974 | Bagnulo . |
| 3,909,049 | 9/1975 | Blatnica ............................. 285/416 |
| 4,026,583 | 5/1977 | Gottlieb ............................. 285/55 |

FOREIGN PATENT DOCUMENTS 828783  1/1952  Fed. Rep. of Germany ........ 285/55

*Primary Examiner*—Thomas F. Callaghan
*Attorney, Agent, or Firm*—Patrick J. Viccaro

[57] ABSTRACT

A corrosion resistant tube assembly is disclosed comprising a corrosion susceptible metal tubing having an outside surface, an inside surface and end surfaces. Peripheral end portions of the tubing are provided with an overlay of corrosion resistant metal extending along a portion of the outside surface and across the end surfaces of the peripheral end portions of the corrosion susceptible metal tubing. The overlay has an inside surface and an outside surface provided with threads at a depth less than that which would expose the outside surface of the corrosion susceptible tubing. The assembly also includes a corrosion resistant, tubular metallic liner having an outside surface disposed adjacent the inside surface of the corrosion susceptible metal tubing, and end surfaces extending beyond the end surfaces of the corrosion susceptible metal tubing. The end surfaces of the liner are secured to the inside surface of the overlay around the circumference thereof such that all inside surfaces of the tube assembly comprise corrosion resistant material. Multiple tubes of this invention may be longitudinally aligned and threaded to one another, or to a common metallic convector having a corrosion resistant inside surface.

20 Claims, 4 Drawing Figures

CORROSION RESISTANT TUBE ASSEMBLY

SUMMARY OF THE INVENTION

The present invention pertains to a metallic tube assembly having corrosion resistant inside surfaces along the length thereof including connecting portions of adjacent tubes longitudinally aligned and secured to one another. More particularly, the present invention is directed to carbon or low-alloy steel oil well tubing provided with a corrosion resistant liner and corrosion resistant weld overlay end portions, to provide a tube assembly wherein all inside surfaces are provided with corrosion resistant material.

With the dwindling oil and gas reserves, it has become necessary to drill for oil and gas at greater depths, often in excess of 20,000 feet. This necessary trend to deeper wells is expected to continue. Such wells may contain from moderate to very high amounts of corrosives including hydrogen sulfide, carbon dioxide and various chlorides. Wells containing corrosives are commonly called sour wells. The metallic tubing used in the construction of oil and gas wells is typically exposed to such corrosives at temperatures as high as about 300° F. to 500° F. or higher, which substantially increases the metals' susceptibility to corrosion. Another adverse condition to which such metallic tubing is exposed, is hydrogen-induced embrittlement of the metal. And, the higher strength materials required for wells, particularly the deeper wells, are more susceptible to hydrogen embrittlement than the lower strength metals.

Oil and gas wells, in the past, have consisted of carbon steel tubing. With the requirements for deeper wells and in consideration of the severe corrosive environments to which the tubing may be exposed, alternative materials are required. A prior approach of providing inhibitors in carbon steel poses logistic problems requires auxiliary handling and treatment facilities, is expensive and may not be economical for certain severe corrosive conditions experienced in many sour wells. Present alternative considerations include the idea of completely converting from carbon steel tubing to various types of stainless steel tubing depending upon the severity of the conditions. Considering the expense involved in extruding the tonnage of stainless steel tubing required for deep wells, it becomes apparent that a successful alternative would be desirable.

Accordingly, the present invention provides a new and improved tube assembly which provides corrosion resistant material at all interior surfaces thereof capable of withstanding the corrosive environment over the service life of a deep, sour well.

Various types of liners for tubing are known in the prior art as evidenced by U.S. Pat. Nos. 1,306,690, 1,827,437, 1,840,305, 2,258,563, 2,303,778, 3,077,661, 3,192,612 and 3,758,361. Also, the use of gaskets at pipe joints to inhibit corrosion is taught in U.S. Pat. Nos. 1,989,614, 2,201,862, 2,919,936 and 3,020,068. The practice of plating selective areas of parts to be connected is disclosed in U.S. Pat. No. 2,240,021. Additionally, the prior art has taught various arrangements to inhibit corrosion in connected pipes, including the teachings of U.S. Pat. No. 2,216,033, 3,843,170 and 4,026,583.

Despite the teachings of the prior art in the general area of preventing corrosion in pipes and tubes, the present invention provides a novel tube assembly which insures that all of the inside surfaces of the assembly are not subject to corrosive attack and minimizes the cost of providing an acceptable corrosion resistant tube assembly.

The present invention may be summarized as providing corrosion susceptible metal tubing having an outside surface, an inside surface and end surfaces. Peripheral end portions of the tubing are provided with an overlay of corrosion resistant metal extending along a portion of the outside surface and across the end surfaces of the peripheral end portions of the corrosion susceptible metal tubing. The overlay has an inside surface and an outside surface provided with threads at a depth less than that which would expose the outside surface of the corrosion susceptible tubing. The assembly also includes a corrosion resistant, tubular metallic liner having an outside surface disposed adjacent the inside surface of the corrosion susceptible metal tubing, and end surfaces extending beyond the end surfaces of the corrosion susceptible metal tubing. The end surfaces of the liner are secured to the inside surface of the overlay around the circumference thereof such that all inside surfaces of the tube assembly comprise corrosion resistant material. Multiple tubes of this invention may be longitudinally aligned and threaded to one another, or to a common metallic connector having a corrosion resistant inside surface.

Among the advantages of the present invention is the provision of a reliable tube assembly for wells wherein all of the inside surfaces of such assembly are comprised of corrosion resistant materials.

An objective of this invention is to provide a tube assembly for applications, such as deep oil wells, which is adequately corrosion resistant, yet is considerably less expensive than other existing or anticipated internally corrosion resistant tube assemblies.

Another advantage of the present invention is to provide a tube assembly comprised of carbon steel or low-alloy steel along the outside surfaces, which eliminates galvanic corrosion problems between the tube assembly and the carbon steel casing within which such tubes are typically inserted in service.

These and other objectives and advantages of this invention will be more fully understood and appreciated with reference to the following detailed description and the drawing.

DETAILED DESCRIPTION

Figure 1:
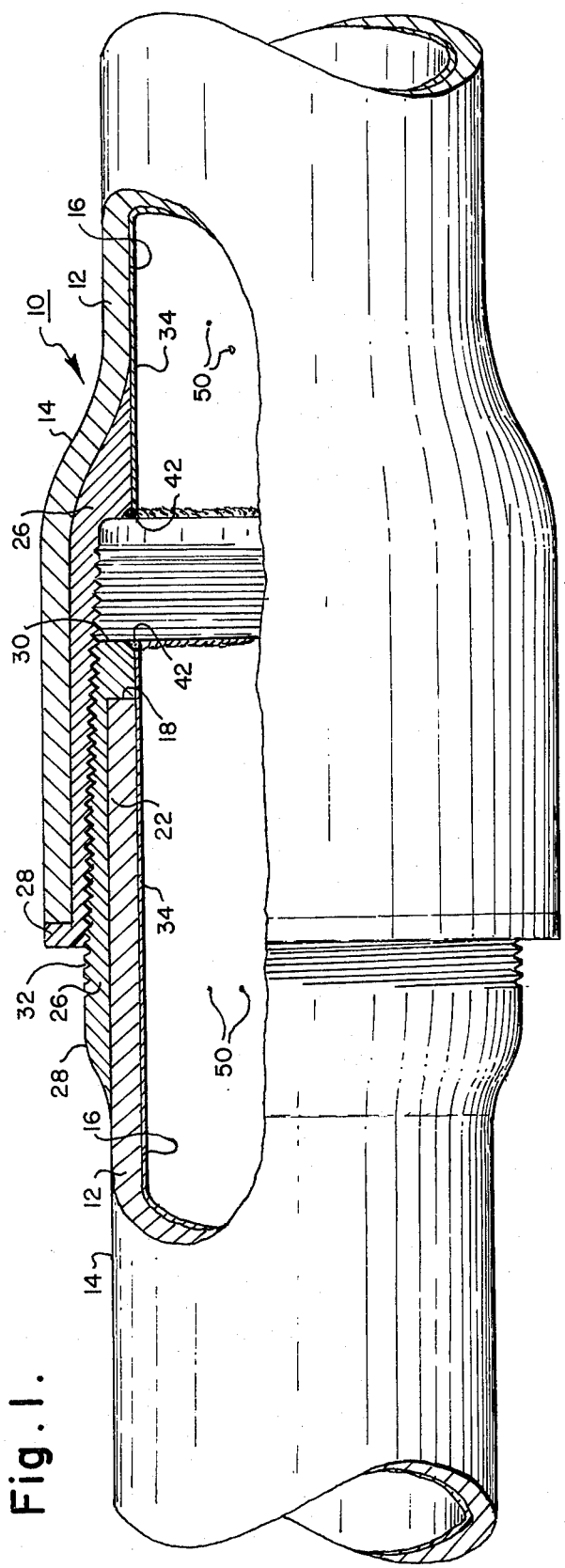
FIG. 1 is a cross-sectional view of a tube assembly of the present invention.
Figure 2:
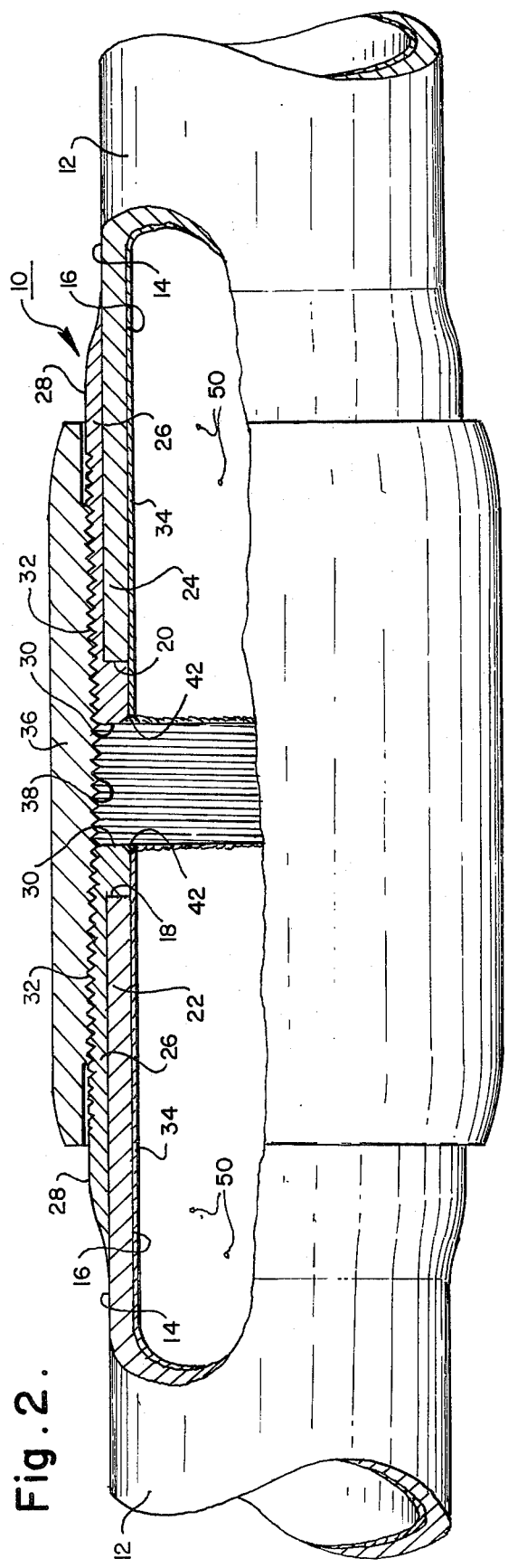
FIG. 2 is a partially cutaway view, partially in cross-section, of a tube assembly of the present invention.
Figure 3:
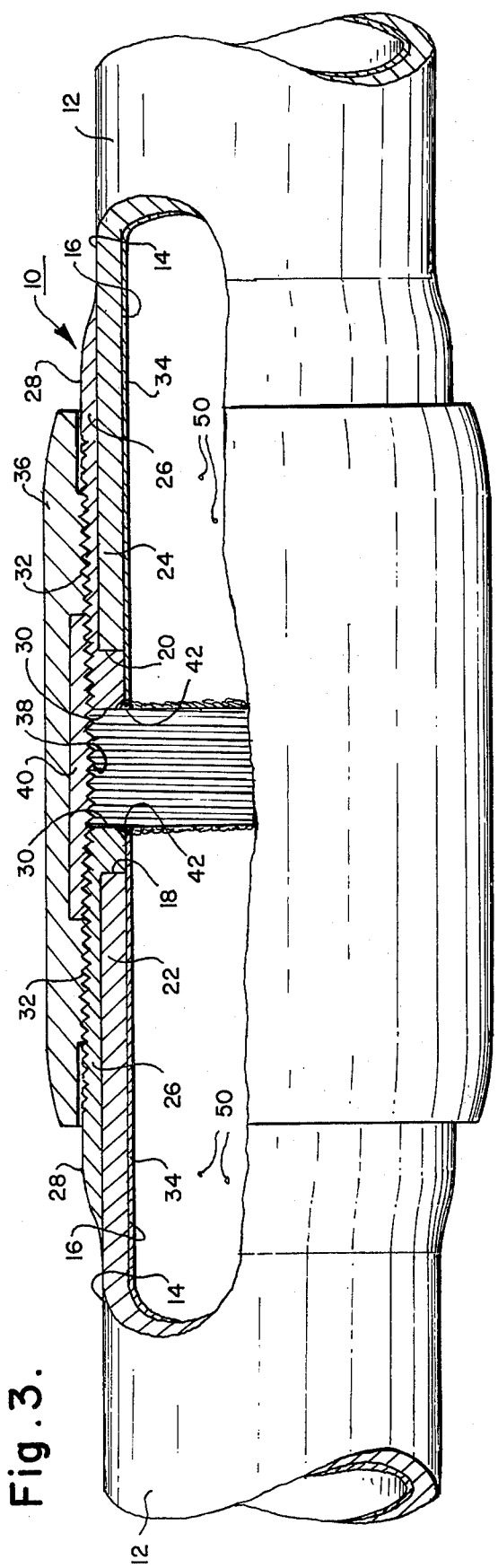
FIG. 3 is a partially cutaway view, partially in cross-section of an alternative tube assembly of the present invention.

As illustrated in the drawings, the tube assembly 10 of the present invention is provided with corrosion resistant surfaces in the interior thereof. As shown in FIGS. 1, 2 and 3 a significant portion of the tube assembly is comprised of corrosion susceptible metal tubing 12. As will be explained in detail below, the corrosion susceptible metal tubing 12 is not exposed to corrosives in the assembly 10. Therefore, conventional, low cost carbon steel such as C75 or C80, or other low-alloy steels, can be utilized as the corrosive susceptible material. It should be appreciated that various grades and alloys of carbon steel and other metals may be employed as the corrosive susceptible tubing 12 of the assembly 10 of this invention.

Figure 4:
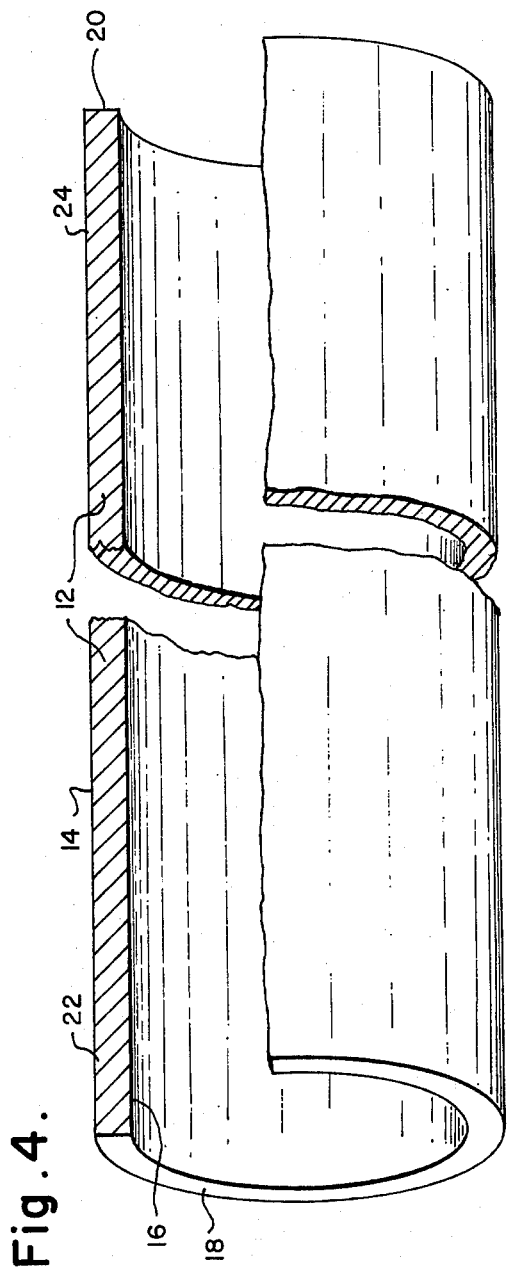
FIG. 4 is a partially cutaway view of a corrosion susceptible tube used in the assembly of the present invention.

The corrosion susceptible metal tubing 12 has an outside surface 14, an inside surface 16 and end surfaces 18 and 20, as best shown in FIG. 4. Tubes 12 of various lengths, diameters, gage and shapes including curved tubes, tubes having T-shapes, Y-shapes and other junctions as well as tubes having reducing diameters along the length thereof are comprehended by the assembly of the present invention. Regardless of the type or shape of corrosion susceptible tubing employed, the end portions 22 and 24 as shown in FIG. 4 are provided with an overlay 26 of corrision resistant metal, such as stainless steel, at least along a portion of the outside surface 14 and across the annular end surfaces 18 and 20 of the corrosion resistant tube 12.

The overlay 26 is comprised of any corrosion resistant alloy, preferably stainless steel, or other material such as nickel base, cobalt base alloys, chromium-nickel-cobalt-molybdenum alloys, titanium or titanium alloys. However, a variety of corrosion resistant overlay materials may be selected depending upon the particular corrosion environment, and the required strength of the overlay weld material. After the overlay 26 is provided, typically by welding, onto the peripheral end of the corrosion susceptible pipe 12, as described above, the overlay 26 may have to be dressed to remove a slag residue and to provide a generally smooth outside surface 28 and generally smooth end surface 30 for the overlay 26. Also, if necessary, the overlay 26 may be cold worked by any available technique in order to increase its strength. The outside surface 28 of the overlay 26 is threaded around its circumference as shown by reference numeral 32. It should be understood that the threading operation could also simultaneously accomplish the desired dressing operation. The thread size, space, pitch, etc. should be chosen with respect to the service conditions, sealing requirements, and strength requirements for the tube assembly of the present invention. The depth of such threads 32 must not penetrate the overlay to expose any of the outside surface 14 of the corrosion susceptible pipe 12.

A corrosion resistant, metallic liner 34 is provided within the corrosive susceptible tube 12. In one embodiment the liner 34 is a separate element which is disposed in and along the entire length of the tube 12. Typically, such liner 34 will have a gage of about 0.005 to 0.100 inch, or more preferably within the range of from 0.010 to 0.040 inch. Most preferred liners for oil well applications will have a gage of about 0.015 to 0.030 inch. In another embodiment the liner may be coextruded, explosively bonded or otherwise metallurgically bonded to the inside surface of the tube 12. The liner extends at least to the end surfaces 18 and 20 of the tube 12, and preferably beyond such end surfaces 18 and 20, to within the inside surface of the overlay 26.

The end portions of the liner are preferably welded to the inside surface 30 of the overlay 26, around the circumference thereof. Such weld 42 isolates the inside surface 16 of the tube 12 and the end surfaces 18 and 20 of the tube 12 from the interior of the tube assembly 10. Such weld 42, which provides a metallurgical bond between the liner 34 and the tube 12, is preferably gas-tungsten arc seal welded (TIG), with stainless steel weld metal although other appropriate welding processes may be employed.

Rather than creating a metallurgical bond, the liner 34 may also be adhesively bonded to the tube 12. Such adhesive bonding may be accomplished by hydraulically or mechanically expanding the liner 34 within the tube 12.

It has also been found that a few pin holes 50 may be provided through a liner 34 without adversely affecting corrosion conditions or the load bearing characteristics of the tube assembly 10. For example, pin holes having a diameter of about 1/64 to about 1/32 inch will permit hydrogen that may accumulate between the outside surface of the liner 34 and the inside surface of the tube 12, to be vented thus protecting the liner 34 from possible deformation that may otherwise be caused by hydrogen pressure.

With the end portions of the lined tubes treated as described above, two or more longitudinally aligned end portions of such tubing may be connected, as shown in FIG. 1 by threading to one another. Alternatively, as shown in FIGS. 2 and 3 such tubes may be attached by threading an appropriate connector 36 onto the threads 32 provided along the outside surface 28 of the overlay 26 on the aligned tubes. In such embodiment the inside surface 38 of the connector 36 must be comprised of a corrosion resistant material at least at the junction of the two longitudinally aligned end portions of the tubes 12. In one embodiment, as shown in FIG. 2, the connector may be comprised totally of a corrosion resistant material, such as stainless steel. In another embodiment, as shown in FIG. 3, the inside surface 38 may be comprised of a bonded coating 40 of corrosion resistant material such as stainless steel. When employed, the bonded coating 40 on the inside surface 38 should extend at least ¼ inch and preferably at least ½ inch into the theaded area of the overlay 26.

It should also be appreciated that various additional considerations may have to be taken into account in constructing tube assemblies of the present invention. For example, the expansion characteristics and differentials between the tube, the liner and the overlay material must not adversely affect the performance and integrity of the tube assembly.

Whereas the preferred embodiments of this invention have been described above for the purpose of illustration, it will be appreciated that numerous variations of the details may be made without departing from the scope of this invention.

I claim:

1. A corrosion resistant tube assembly comprising:
   a plurality of corrosion susceptible metal tubes each having an outside surface, an inside surface and end surface,
   an overlay of corrosion resistant metal extending along a portion of the outside surface and across the annular end surfaces of the peripheral end portions of each tube, said overlay having an inside surface and an outside surface, said outside surface provided with threads at a depth less than that which would expose the corrosion susceptible tube, and
   a corrosion resistant, tubular metallic liner, having an outside surface, an inside surface and end surfaces adjacent the inside surface of each corrosion susceptible metal tube, around the circumference thereof, extending at least to the end surfaces of each corrosion susceptible metal tube, with the end surfaces of the liner secured to the inside surface of the overlay, and a metallic connector having threads and a corrosion resistant inside surface and being threaded onto the outside surface of each overlay on the peripheral end portions of adjacent, longitudinally aligned tubes, such that all inside surfaces of the tube assembly comprise corrosion resistant material.

2. An assembly as set forth in claim 1 wherein said assembly is resistant to corrosives selected from the group consisting of hydrogen sulfide, carbon dioxide, chlorides and mixtures thereof.

3. An assembly as set forth in claim 1 wherein the corrosion susceptible tubing is selected from the group consisting of carbon steel and low-alloy steel.

4. An assembly as set forth in claim 1 wherein the overlay is a material selected from the group consisting of stainless steel, nickel base alloy, cobalt base alloy, chrome-nickel-cobalt-molybdenum alloy, titanium and titanium alloy.

5. An assembly as set forth in claim 1 wherein the tubular liner is a material selected from the group consisting of stailness steel, nickel base alloy, cobalt base alloy, chrome-nickel-cobalt-molybdenum alloy, titanium and titanium alloy.

6. An assembly as set forth in claim 1 wherein the liner has a wall thickness of from about 0.005 to 0.100 inch.

7. An assembly as set forth in claim 6 wherein the liner has a wall thickness of from about 0.010 to 0.040 inch.

8. An assembly as set forth in claim 6 wherein the liner has a wall thickness of from about 0.015 to 0.030 inch.

9. An assembly as set forth in claim 1 wherein the end surfaces of the liner extend approximately to the end of the overlay on the peripheral end portions of the tubing.

10. An assembly as set forth in claim 1 wherein the metallic connector is stainless steel.

11. An assembly as set forth in claim 1 wherein the inside surface of the metallic connector at the junction of the longitudinally aligned peripheral end portions of tubing comprises an overlay of corrosion resistant metal.

12. An assembly as set forth in claim 11 wherein the connector is a material selected from the group consisting of carbon steel and low-alloy steel, and the overlay thereon is a material selected from the group consisting of stainless steel, nickel base alloy, cobalt base alloy, chrome-nickel-cobalt-molybdenum alloy, titanium and titanium alloy.

13. An assembly as set forth in claim 1 wherein the end portions of the liner are metallurgically bonded to the inside surface of the overlay around the circumference thereof.

14. An assembly as set forth in claim 13 wherein the metallurgical bond is obtained by welding with a corrosion resistant weld metal.

15. An assembly as set forth in claim 13 wherein the liner is coextruded with the corrosion susceptible tubing.

16. An assembly as set forth in claim 1 wherein the end portions of the liner are adhesively bonded to the inside surface of the overlay around the circumference thereof.

17. An assembly as set forth in claim 16 wherein the adhesive bond is obtained by expansion of the liner inside the tube.

18. An assembly as set forth in claim 1 wherein at least one vent hole is provided through the liner of sufficient size to permit gas transfer therethrough.

19. An assembly as set forth in claim 18 wherein the vent hole has a diameter of from about 1/64 inch to about 1/32 inch.

20. A tube assembly resistant to corrosives selected from the group consisting of hydrogen sulfide, carbon dioxide, chlorides and mixtures thereof comprising:

carbon steel tubing having an outside surface, an inside surface, and end surfaces, a stainless steel overlay extending along a portion of the outside surface and across the annular end surface of the peripheral end portions of said carbon steel tubing, said overlay having an inside surface and an outside surface, said outside surface provided with threads at a depth less than that which would expose the outside surface of the carbon steel tubing, a seamless stainless steel tubular liner having an outside surface, an inside surface, end surfaces and a wall thickness of from about 0.010 to 0.040 inch, with the outside surface of the liner disposed adjacent the inside surface of the carbon steel tubing, around the circumference thereof, with the end surfaces of the liner extending at least to the end surfaces of the carbon steel tubing, and with the end surfaces of the liner welded with stainless steel weld metal to the inside surface of the overlay around the circumference thereof, and a stainless steel connector having threads on the inside surface and being threaded onto the outside surface of each overlay on the peripheral end portions of adjacent, longitudinally aligned tubing.

* * * * *